United States Patent [19]
Korver

[11] 3,993,435
[45] Nov. 23, 1976

[54] GRADIENT DYEING OF LENSES

[75] Inventor: Clayton Paul Korver, Dallas, Tex.

[73] Assignee: Semi-Tech, Inc., Dallas, Tex.

[22] Filed: Feb. 23, 1976

[21] Appl. No.: 660,820

[52] U.S. Cl. ............................................ 8/4; 8/14; 8/150
[51] Int. Cl.² ......................................... D06P 3/00
[58] Field of Search ................... 118/7, 8, 425; 8/4, 8/8, 14, 149, 150; 427/256, 430, 287, 261, 269, 169

[56] References Cited
UNITED STATES PATENTS

| | | | |
|---|---|---|---|
| 1,943,408 | 1/1934 | Zerk | 8/150 X |
| 2,609,269 | 9/1952 | Ryan et al. | 8/4 X |
| 2,923,591 | 2/1960 | Rieser | 8/4 |
| 3,681,123 | 8/1972 | Reilly, Jr. et al. | 118/425 UX |

*Primary Examiner*—Morris Kaplan
*Attorney, Agent, or Firm*—Harvey A. Gilbert

[57] ABSTRACT

A gradient dyeing machine employing a motor driven threaded camshaft to simultaneously rotate a symmetrical cam of appropriate configuration at the end of the shaft and move a ramp-shaped arm pivotally attached to a threaded carriage riding on the camshaft forward from the motor toward the cam at a continuously increasing angle relative to the camshaft over the surface of the rotating cam, to continuously and repeatedly immerse a lens holder to progressively decreasing depths in a lens coloring liquid.

2 Claims, 10 Drawing Figures

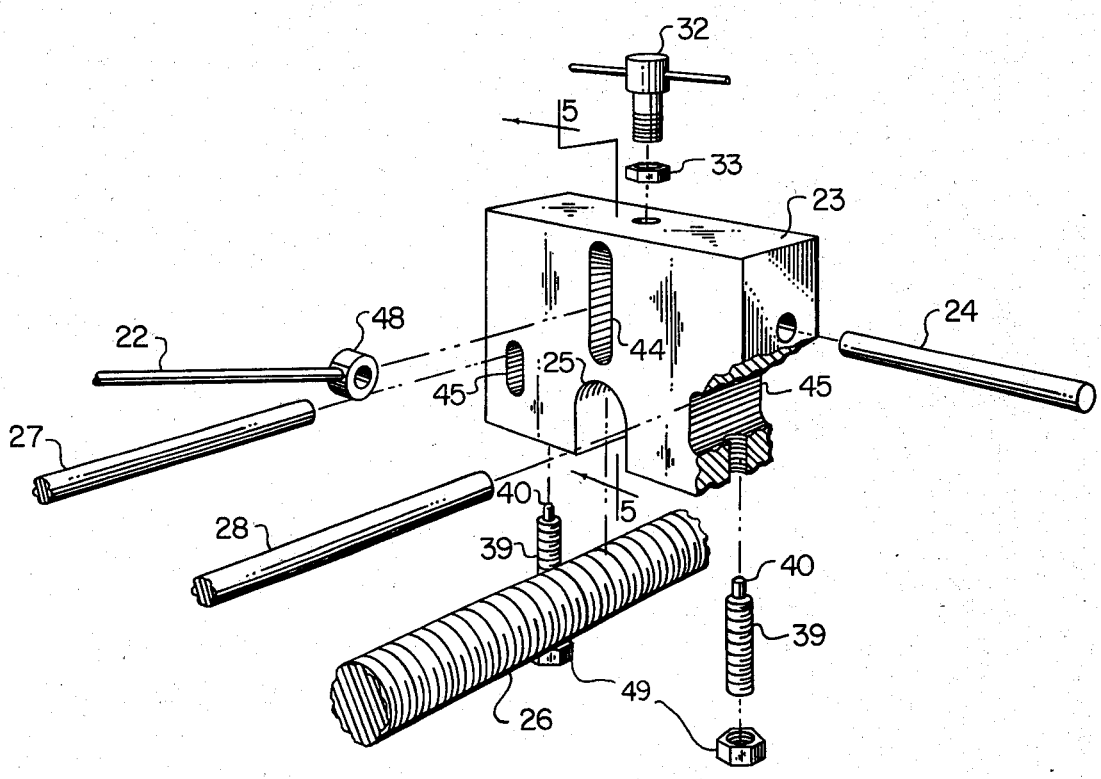
FIG. 4
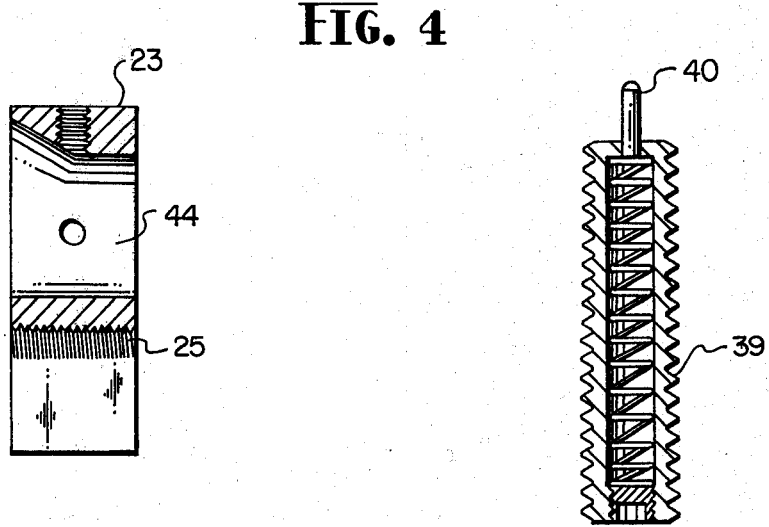
FIG. 5
FIG. 6

GRADIENT DYEING OF LENSES

BACKGROUND OF THE INVENTION

1. Field of the Invention

The invention pertains to the coloring, tinting, and dyeing of lenses, particularly ophthalmic lenses used in eyeglasses. Specifically, the invention relates to gradient coloring, tinting, and dyeing of lenses.

2. Description of the Prior Art

In the process of manufacturing lenses it is often desirable and necessary to add a color, dye, or tint to the lens. In many cases it is very desirable to have a subtle tonal gradation from relatively opaque at the top of the lens to a very mildly tinted or tint free condition at a selected place on the lens, usually from the middle to the bottom. The purpose of the gradient tinting process is to obstruct the passage of bright light and glare, particularly from overhead light, such as sunshine, through the lens to the eye, while permitting good vision through the maximum surface area of the lens.

In the past, optical processing laboratories have customarily performed the gradient coloring process by entirely manual means. Operator fatigue and the irregularities and inconsistancies typical of manual processes were readily apparent in the quality of the final product. The mechanized processes to which the manual techniques have yielded have only slightly improved the product.

Devices currently available for gradient coloring, tinting, and dyeing of lenses, particularly those used for opthalmic applications typically produce harsh, hard, often irregular, and thus highly visible patterns on the lens being coated. These results are particularly objectionable when prescription lenses are involved. They are highly undesirable in all cases from the standpoints of adverse vision affects and appearance of the wearer. Currently used devices typically perform the process in slow, abrupt and discontinuous movements with undesirable pauses at the point of maximum immersion of the lens. The discontinuous movements, in addition to creating streaks and lines, do not provide continuous agitation of the coloring liquid to provide a uniform coloring medium on each immersion cycle.

BRIEF SUMMARY OF THE INVENTION

The present invention performs a continuously smooth lens immersion withdrawl process of continuously diminishing immersion depth while simultaneously agitating the coloring medium for chemical uniformity. The resulting product is a lens having a smoothly, continuously varying color gradient from more color density at the top of the lens to less color density or clear lens from an intermediate level down from the top toward the bottom of the lens.

Thus, one object of the subject invention is to improve the manufacture of lenses prescribed to have gradient coloring.

Another object of the invention is to make possible the consistent and repeatable application of dyes, tints, coloring, and other tonal gradations to lenses, such as for eyeglasses.

Yet another object of the invention is to provide a method of maintaining the chemical uniformity of the coloring medium during the process of applying tonal gradations to the lenses.

Another object of the invention is to provide a method of creating a subtle and virtually imperceptible change in the gradations of tinting, dyeing, or other tonal coloring of lenses of various sizes, such as lenses for eyeglasses.

Still another object of the invention is to permit the application of tint, dye, or other color gradations to lenses, such as lenses for eyeglasses, making possible careful contol of the area where the tinting discontinues and the clear glass, plastic, or other material begins.

Yet another object of the invention is to improve contol of the application of gradient coloration to lenses by providing means for continuous, uninterrupted process performance after operator initiation until automatic shutoff at process conclusion.

Still another object of the invention is to provide an audible, visual, or other indication or combination of indications that the process is completed.

BRIEF DESCRIPTION OF THE DRAWINGS

FIG. 4 is an exploded partial sectional view of the threaded traveling carriage and the elements which permit the combined forward and up and down vacillating movement of lifting arm 22.

FIG. 5 is a mid sectional view through the threaded traveling carriage to show the receptacle 44 within which lifting arm 22 is pivotally retained in relation to the threaded channel.

FIG. 6 is a sectional view of one of a pair of spring loaded bolts showing the spring actuated holding pin for maintaining the horizontal travel of the threaded traveling carriage 23 and permitting its lifting for manual return in relation to traverse rods 27 and 28.

DETAILED DESCRIPTION OF THE INVENTION

Figure 1:
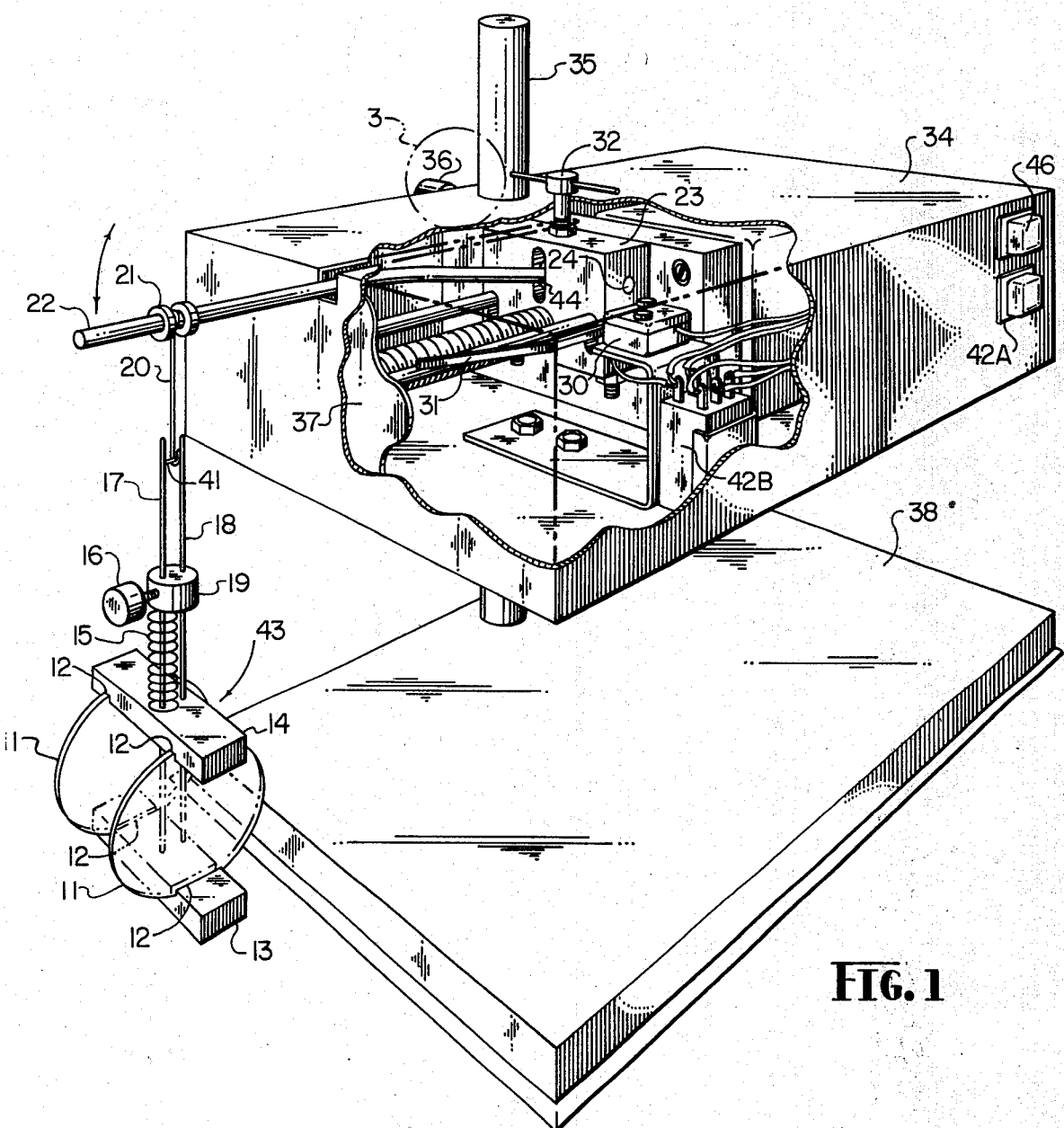
FIG. 1 is a partially cut-away perspective view of the gradient dyeing machine.

Referring to FIG. 1, the Gradient Dyeing Machine is shown in its preferred operational embodiment.

Figure 3:
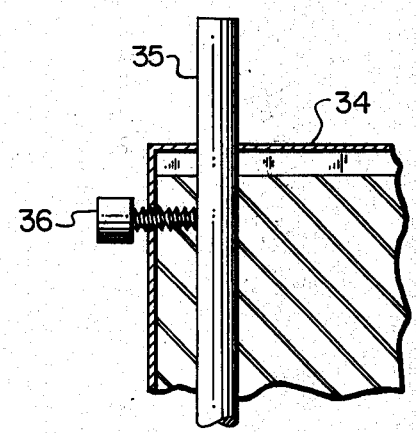
FIG. 3 is a partial side interior view of the gradient dyeing machine showing height adjustment screw 36 for setting the operating elevation of the immersion controller 34 on vertical support post 35.

Vertical support post 35 is mounted to base 38 and immersion controller 34 is slid down upon and secured to vertical support post 35 by means of height adjustment screw 36 at a height sufficient to permit the desired gradient immersion range for a particular size lens retained in lens carrier 43. FIG. 3 is a sectional view showing height adjustment screw 36 securing immersion controller 34 to vertical support post 35.

One or more lenses 11 are placed top side down in lens carrier 43 within vertically in-line shallow slots 12 in the facing sides of bottom lens support block 13 and top lens holding block 14. Top lens holding block 14 is maintained in fixed lateral relationship with respect to bottom lens support block 13 by means of vertical guide rods 17 and 18 which are permanently affixed in parallel with each other to the inboard face of bottom lens support block 13 at one extremity and by spacer rod 41 near the opposite extremity of said rods. Top lens holding block 14 can be moved up or down or vertical guide rods 17 and 18 to accommodate lenses of various sizes. Lenses are secured between top lens holding block 14 and bottom lens support block 13 by means of set screw 16 tightened against vertical guide rod 17 so that sliding anchor block 19 places spring 15 in compression against top lens holding block 14.

Lens carrier 43 thus described, with lenses 11 secured for processing, is suspended from spacer rod 41 by hanger 20 which rests on movable hanger retainer 21 at a selected point near the free end of lifting arm 22. Hanger 20 may be a two-sided hook or other easily removable suspension means. The opposite end of lifting arm 22 is movably secured within receptacle 44 of threaded traveling carriage 23 about pivot axle 24. FIG. 4 is an exploded partial sectional view of threaded traveling carriage 23. Pivot wheel 48 fits within receptacle 44 secured movably in position by pivot axle 24 to permit vertical plane rotation within the upper and lower confines of slot 44 as seen in the sectional view of FIG. 5.

Figure 7:
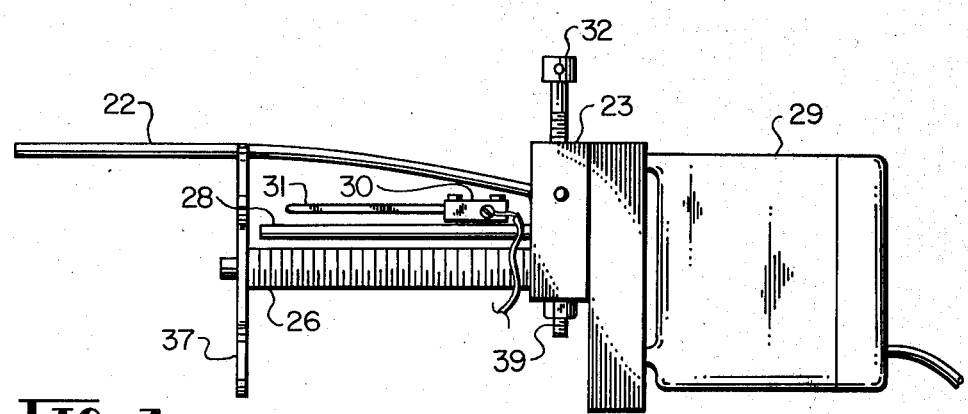
FIG. 7 is a side perspective view of the threaded traveling carriage 23 at its initial position against the front face of electric motor 29 with lifting arm 22 in a horizontal position as it travels down a lobe of cam 37.
Figure 8:
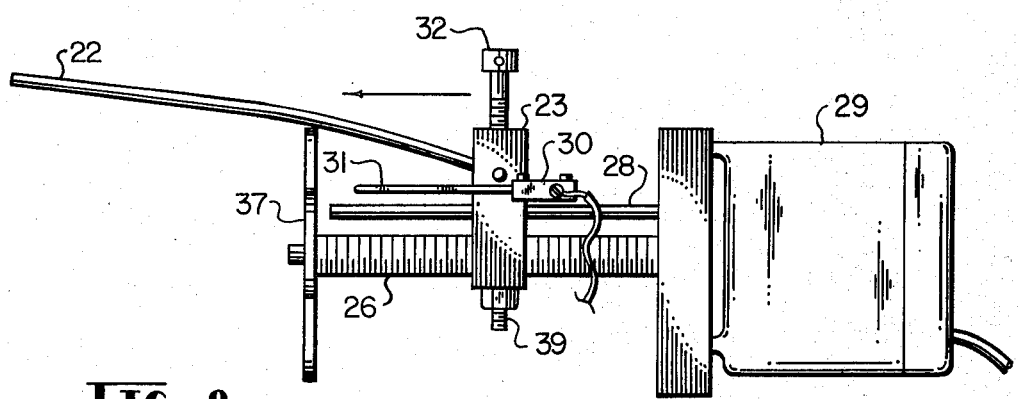
FIG. 8 is a side perspective view of threaded traveling carriage 23 approximately midway in its travel forward on threaded camshaft 26 with the free end of lifting arm 22 elevated to approximately 50 percent of its maximum vertical travel and at a point at the top of a cam lobe.
Figure 9:
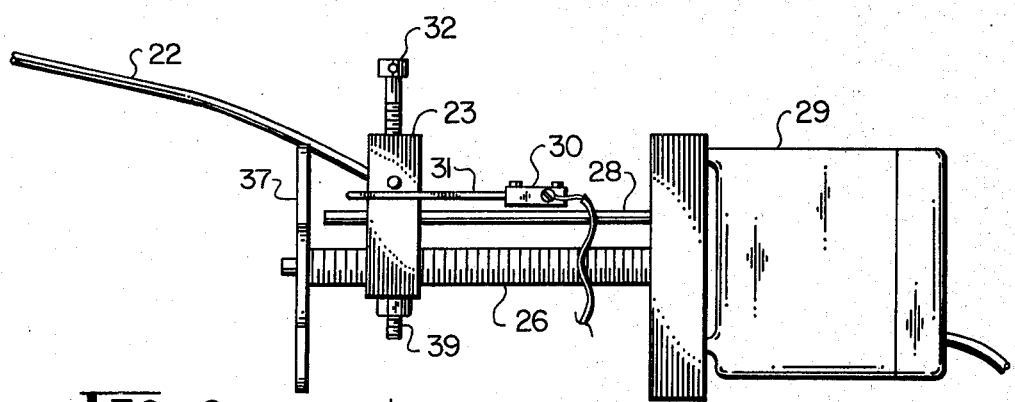
FIG. 9 is a side perspective view of threaded traveling carriage 23 at its maximum point of forward travel on threaded camshaft 26 where physical contact is fully made with limit switch feeler 31, stopping electrical propulsion, with lifting arm 22 resting just beyond a peak on a lobe of cam 37 with the free end of lifting arm 22 at its maximum point of vertical travel.

Threaded traveling carriage 23 rests on threaded camshaft 26, as shown in FIG. 4, which is connected to the driveshaft of electric motor 29 on one end to the center of cam 37 at the other, as may be seen in FIG. 7. Traverse rods 27 and 28, cantilever mounted parallel to threaded camshaft 26 from the face of electric motor 29, as shown in FIG. 8, pass through vertically oriented slots 45 parallel to each other on opposite sides of threaded traveling carriage 23 as clearly shown in FIG. 4, to constrain forward travel of said carriage horizontally to the top half of threaded camshaft 26 toward cam 37. Threaded traveling carriage 23 is maintained in horizontal relation to traverse rods 27 and 28 against the upper surfaces of vertical slots 45 by the upward force applied by holding pins 40 in spring loaded bolts 39 shown in sectional view in FIG. 6, threadably inserted at the midpoint in the bottom of each slot 45, as shown in FIG. 4. Retainer nuts 49 secure spring loaded bolts 39 to threaded traveling carriage 23.

The vertically oriented slots in threaded traveling carriage 23 and the movable pins 40 in spring load bolts 39 permit threaded traveling carriage 23 to be lifted free from engagement with threaded camshaft 26 by means of T-bar lift 32 secured to the top of threaded traveling carriage 23 by lock nut 33 as shown in FIG. 4. This vertical removal from threaded camshaft 26 permits manual return of assembled threaded traveling carriage 23 and pivotally attached lifting arm 22 to its initial location adjacent to electric motor 29 from the closest point of approach of threaded traveling carriage 23 to cam 37, as may be seen in FIG. 10.

Figure 2:
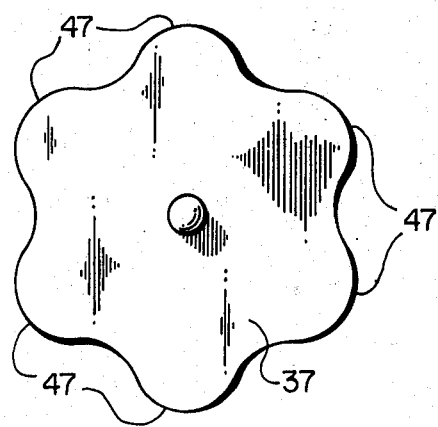
FIG. 2 is perspective view of cam 37 showing the curvilinear symmetrical lobes.

In order to visualize the operation discussion which follows it should be noted in FIG. 1 and FIGS. 7 through 10 that lifting arm 22 is bent at approximately its midpoint such that the included angle from end to end is between 150° and 175° with 170° being preferred. Also, of equal importance is the symmetrical configuration of cam 37 having six symmetrical lobes 47 as shown in FIG. 2.

In a typical operating sequence, switch 46 is placed in the on position, electric motor 29 rotates threaded camshaft 26, causing engaged threaded traveling carriage 23 and lifting arm 22 pivotally secured thereto by pivot axle 24, to travel forward upon threaded camshaft 26 toward simultaneously rotating cam 37. The initial position of threaded traveling carriage 23 is shown in FIG. 7. Motor 29 is speed reduced to rotate at 1 or 2 revolutions per minute.

The combination of slow continuous forward travel of lifting arm 22 toward and over cam 37, causing lifting arm 22 to pivot about pivot axle 24 within receptacle 44 at a continuously increasing elevation angle with respect to threaded camshaft 26 while simultaneously constrained to travel the symmetrical curvilinear lobes 47 of cam 37 during each complete revolution of threaded camshaft 26 produces the desired total number of continuous up and down excursions of lifting arm 22 at a continuously increasing absolute elevation. FIGS. 7 and 8 show intermediate positions of threaded traveling carriage 23 and associated elevation of lifting arm 22. Hanger 20 in FIG. 1 is freely suspended from hanger retainer 21 near the free end of lifting arm 22 to translate the excursions of lifting arm 22 to vertical movements. These vertical movements are communicated directly to lens carrier 43 suspended from hanger 20 to accomplish the gradient coloring of lens 11 by continuously alternating immersion and withdrawal of said lens from the coloring fluid from a maximum initial immersion depth to progressively decreasing depths until final, complete withdrawl.

The smooth, slowly and continuously alternating immersion and withdrawl motion communicated to lens carrier 43 by the combined rotation of threaded camshaft 26 imparting simultaneously translational foward and rotationally upward motion to lifting arm 22 while at the same time superimposing the oscillatory motion components created as lifting arm 22 traverses the symmetrical lobes 47 of cam 37 result in low turbulence coloring liquid condition on lens immersion with the desired eddy mixing action for chemical uniformity.

Figure 10:
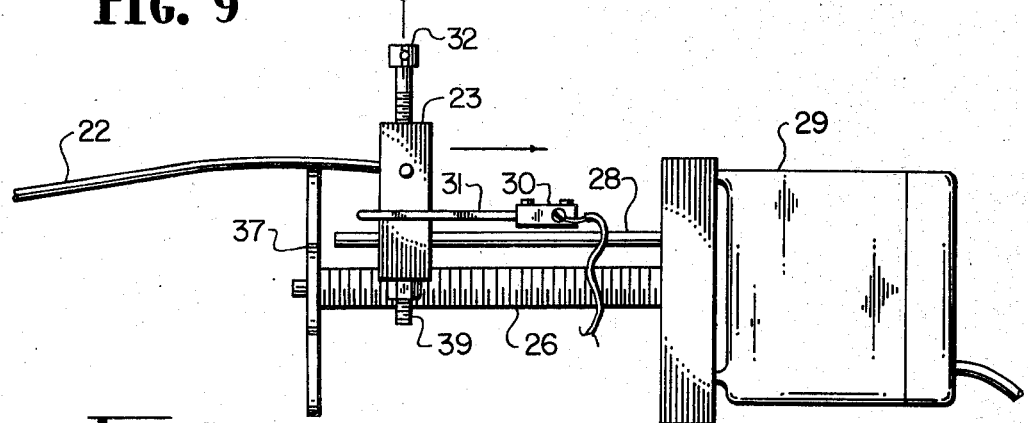
FIG. 10 is side perspective view of threaded traveling carriage 23 at its maximum point of forwarded travel from electric motor 29 to cam 38, being lifted vertically from threaded camshaft 26 by means of T-bar lift 32 for manual return to its initial position against the front face of electric motor 29.

The processcontinues until threaded traveling carriage 23 approaches cam 37 close enough, as shown in FIG. 10, to make contact with limit switch feeler 31, shown in FIG. 1, which causes limit switch 30 to stop motor 29 and activate a process conclusion alarm consisting of light 42A and buzzer 42B. Also, referring to FIG. 9, with lifting arm 22 in its maximum fully raised position, lens carrier 43 in FIG. 1, is completely withdrawn from the lens coloring liquid. Lens carrier 45 is then removed from lifting arm 22 and threaded traveling carriage 23 is lifted manually from threaded camshaft 26 by means of T-bar lift 32, as shown in FIG. 10, for transport back to its initial location adjacent to electic motor 29, as shown in FIG. 7.

It should be apparent from the above that many changes in construction and configuration of the subject invention are possible without departing from the spirit of the invention described herein and the accompanying claims.

I hereby claim:

1. The method of simultaneously combining rotationally created foward translational motion with resulting translationally produced elevational motion and curvilinear created vertical oscillational motion superimposed upon said elevational motion to produce multiple low turbulence entry and withdrawl excursions to successively decreasing depths, of a lens into and out of a coloring liquid which is thereby continuously eddy circulated for maintenance of coloring chemical uniformity during 2. The process for gradient coloring a lens, such as a lens for eyeglasses comprising the steps of,
   alternately immersing and withdrawing said lens vertically into and out of a lens coloring liquid to progressively lesser depths on each successive immersion, and
   simultaneously maintaining chemical uniformity and maximizing surface level stability of the coloring liquid by continuous lens and lens carrier entry and exit motion from the liquid for minimum turbulence eddy circulation.

* * * * *